United States Patent [19]
Thompson

[11] 4,417,539
[45] Nov. 29, 1983

[54] UNIVERSAL CHOCK

[76] Inventor: David M. Thompson, 803 Mantoloking Rd., Brick Town, N.J. 08723

[21] Appl. No.: 297,780

[22] Filed: Aug. 31, 1981

[51] Int. Cl.$^3$ ............................................. B63B 23/66
[52] U.S. Cl. .................................... 114/381; 114/218; 114/364; D8/382
[58] Field of Search ............... 114/199, 200, 218, 343, 114/364, 381; D8/356, 382, 355, 354; 220/4 B, 4 E, 75, DIG. 25

[56] References Cited

U.S. PATENT DOCUMENTS

| D. 244,083 | 4/1977 | Pfeiffer | D8/354 |
| D. 254,595 | 4/1980 | Hart | D8/382 |
| 2,608,174 | 8/1952 | Sponenburg | 114/199 |
| 3,126,858 | 3/1964 | Rosinski | 114/218 |
| 4,056,235 | 11/1977 | Roe et al. | 220/4 E |

FOREIGN PATENT DOCUMENTS

| 557554 | 5/1958 | Canada | 220/4 E |
| 1271637 | 11/1961 | France | 220/4 E |
| 1187708 | 4/1970 | United Kingdom | 220/4 E |

OTHER PUBLICATIONS

IBM, Technical Disclosure Bulletin, vol. 5, No. 1, Jun. 1962.

Primary Examiner—S. D. Basinger
Assistant Examiner—Stephen P. Avila
Attorney, Agent, or Firm—Charles F. Gunderson

[57] ABSTRACT

A chock for use on boats and the like to secure gear to the vessel is made in two halves with identical base plates. The side plates of each half are integral with the base plates, and each half or unit has an upper base plate at one end and a lower base plate at the other end. The upper end of the base plate of one unit is of the same size and shape as the lower end of the base plate of the other unit, and the upper end of the one unit will fit over the lower end of the other unit when they are meshed together. Similarly, the upper end of the base plate of the other unit fits over the lower end of the base plate of the one unit when they are meshed together. Bolts through both upper and lower base plates, at either end, secure both units to any desired location to form a chock, and bolts between the side plates of both units, or other inward projections butting against each other, provide means for securing gear of any kind to any given base.

1 Claim, 3 Drawing Figures

UNIVERSAL CHOCK

BACKGROUND OF THE INVENTION

Chocks, of one kind or another, are essential for making-fast gear, usually on the deck of a boat. Such gear must fasten quickly and firmly in the chock, in a very secure manner, but still be readily-accessible for use in any emergency. Most of these chocks—whether for spinnaker poles, or anchors, or any other type of gear—must be separately formed or molded to accommodate one specific piece of gear, and with thousands of distinct items of gear—seemingly a separate one for each type of boat—and with, maybe, only a few hundred units for some less-well-known types of boats, the cost of tooling, not to mention stocking of spares, becomes very high.

Most chock molds must, therefore, be made of a specific size and shape to accommodate a single piece of gear. They can be either in a single mold, or as a pair of complementary molds, but almost invariably, of the one specific size and shape.

Simple deck braces or chocks can also be made of bent metal or other scrap, but these do not lend themselves to the neat and tidy, shipshape spirit of today's boating and boatsmen.

It is therefore an object of this invention to provide a chock that is fashioned from a single mold to provide a pair of identical, interlocking pieces that can be easily trimmed and drilled to accommodate almost all deck gear, of almost all sizes.

SUMMARY OF THE INVENTION

A chock is formed of two pieces that have a symmetrical and interlocking base section. The base sections are identical, with an upper end and a lower end. The upper end is higher than the lower end by the thickness of the lower end.

In mounting, one of the units is turned around so that its base can be interleaved with the base of the other unit with the upper end of the base of one unit fitting over the lower end of the base of the other unit and vice versa. The interleaved base units can be secured to any desired surface by suitable fastenings of any kind.

Multiple holes can be provided in, or added to, the sides of the chock to oppose each other on either side to receive a bolt or other device to hold down a piece of gear. The upper and lower ends of the base portions of both units can be trimmed or cut off by the same amount to reduce the width of the chock. Mounting holes can be provided or drilled through the ends of the bases to accommodate suitable fastenings.

DETAILED DESCRIPTION OF THE DRAWINGS

Figure 1:
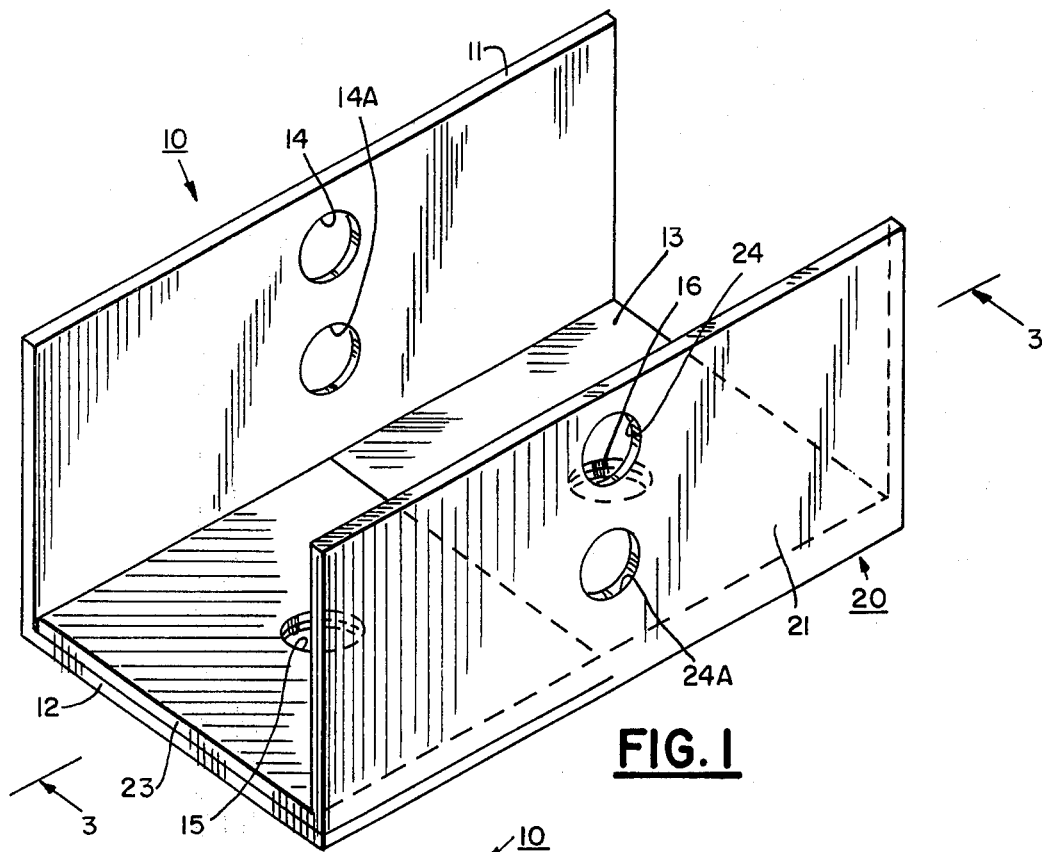
FIG. 1 is an isometric view of a complete chock.

Referring now more particularly to FIG. 1, an isometric view of a chock 10 is shown with one half unit 10 and another half unit 20. The one half 10 has a side plate 11 integral with a lower end 12 of a base plate, and an upper end 13 of a base plate. The typical orientation of the base plates with respect to the side plate will be more clearly seen in FIG. 2.

The other half unit 20 has a side plate 21; a lower end of a base plate (not visible); and an upper end of a base plate 23. The base plates mesh together with the upper end of one over the lower end of the other and vice-versa. This is more clearly seen in FIG. 3. Bolt holes 14 and 14A in the side plate 11 of one unit correspond with bolt holes 24 and 24A in the side plate 21 of the other unit to accommodate gear-securing bolts. Mounting bolt holes 15 and 16 extend through both upper and lower ends of the base plates to secure the chock to a given surface with suitable bolts or fastenings.

Figure 2:
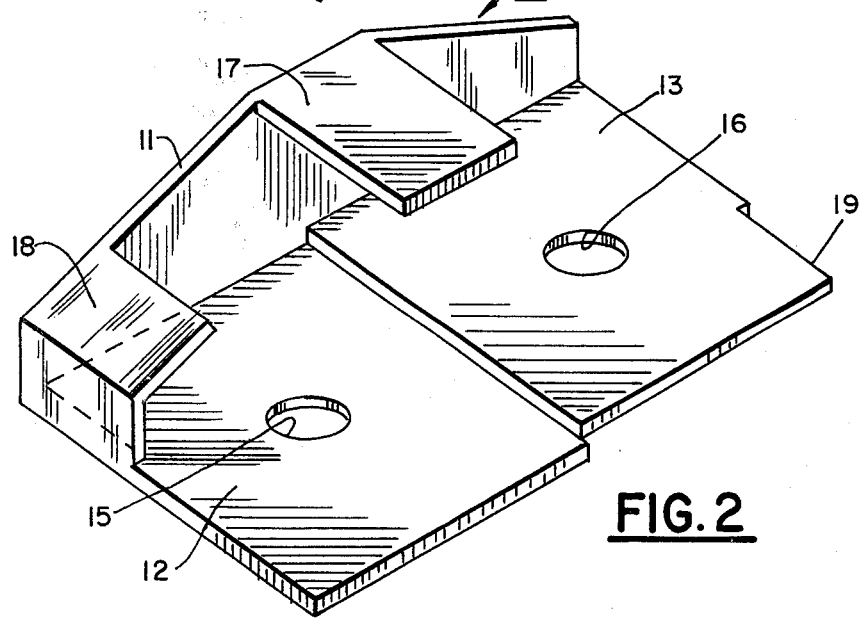
FIG. 2 is an isometric view of a half unit of a slightly different species.

FIG. 2 is an isometric view of one half of a unit with a slightly different configuration, with similar portions similarly numbered. This shows the one half unit 10 with its side plate 11, a lower end of the base plate 12, and an upper end of the base plate 13. However, FIG. 2 also includes a retaining bracket or ledge 17, and a retaining cap or clip 18, which may be molded for specific equipment such as the flukes of an anchor. This involves special molding techniques, which will be explained later, since the halves are not symmetrical.

While the species of FIG. 2, with its bracket 17, may not need a bolt—or bolt holes as seen in FIG. 1—it does need the bolt holes 15 and 16 through the base plates to secure the chock to any suitable surface.

Figure 3:
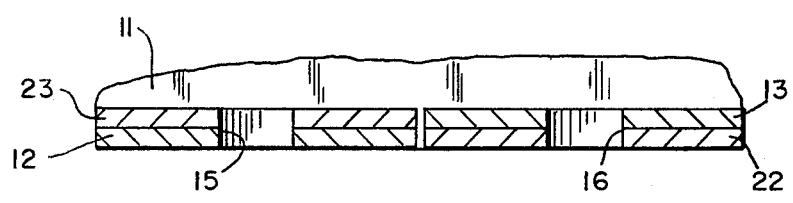
FIG. 3 is a cross section of the base of a typical chock.

FIG. 3 shows a cross section of the base plates meshed together with the upper end of the base plate 13 of the one unit 10 over the lower end of the base plate 22 of the other unit 20, and the upper end of the base plate 23 of the other unit 20 over the lower end of the base plate 12 of the one unit. The bolt holes 15 and 16 are seen passing through both of the intermeshed base plates.

Ideally, as in FIG. 1, both halves are identical, and can be made from the same mold. Since multiple holes may be provided, or added later, and the base plates can be cut to smaller sizes, one single mold can provide a chock that can accommodate a very wide range of gear for an equally wide range of boats. Such chocks may be used for any gear, such as spinnaker poles, oars, boathooks, anchors, etc.; or just be used as a cleat to secure anything such as snatch blocks or cordage.

These chocks can be made from cut and bent metal plate, or more likely, would be molded in one of the newer, stronger plastics. The material of the chock must be strong enough to accommodate the stresses involved, but should also be workable if there is to be any cutting down in size or drilling of additional bolt holes in the side plates or base plates.

In the intermeshing of the base plates, as in this device, there must be enough clearance for the upper and lower base plates to mesh together easily, but they must be snug enough to be able to be drawn together tightly with bolts through 15 and 16. With this chock, each bolt is holding both halves of the chock for maximum security. For a longer chock, additional upper and lower sections of the base plates could be alternated along the length of the chock, intermeshing in the same manner, with bolt holes through each of the pairs of upper and lower base plates in the same manner.

Molding techniques would, ideally, provide identical halves or units, requireing little or no modification, as in the basic species of FIG. 1. However, in some cases, as for example in anchor chocks, it would be better to have retaining brackets or clips, such as 17 and 18 of FIG. 2 to hold the anchor flukes neatly and securely. This need not require a second mold, even though the halves are no longer identical, since plugs can be put into the mold, or taken out of alternate ends of the mold to add the retaining cap 18 or omit it from one end or the other in the same mold.

Various sizes and shapes of chocks of these types are anticipated to accommodate various sizes and shapes of gear. However, the adjustability of each unit bridges the gap between sizes, and the various sizes from small mast mounts to large deck mounts for heavy vessels.

It is to be understood that I do not desire to be limited to the exact details of construction shown and described since obvious modifications will occur to a person skilled in the art.

I claim:

1. A universal chock comprising a first unit having a first side portion and a first base portion with an upper end and a lower end rigidly secured to the bottom of said first side portion, said upper and lower ends being of the same size and extending perpendicularly from said bottom of said first side portion; a second unit having a second side portion and a second base portion with an upper end and a lower end rigidly secured to the bottom of said second side portion, said upper and lower ends being of the same size and extending perpendicularly from said bottom of said second side portion; said upper and lower end of said first base portion being identical to said upper and lower ends of said second base portion; said upper end of said first base portion fitting over said lower end of said second base portion to reach said bottom of said second side portion, and said upper end of said second base portion fitting over said lower end of said first base portion to reach said bottom of said first side portion to form said chock; means extending between said first and second side portions to secure gear comprising a projection extending from the central top of said first side portion towards, and abutting against, a projection extending from the central top of said second side portion; at least one hole in each of said upper ends of said first and second base portions aligned with corresponding holes in said lower ends of said first and second base portions, to accommodate a means for securing said upper and lower ends of said first and second base portions to a given surface; and having an additional projection being V-shaped and being directly attached to one end of the top of said first side portion and said first base portion and extending towards and abutting against a similar projection from the top of the same end of said second side portion and said second base portion.

* * * * *